2,848,464

2-BROMO-9α-FLUOROHYDROCORTISONE AND 21-ESTERS THEREOF

Josef Fried, New Brunswick, N. J., assignor to Olin Mathieson Chemical Corporation, New York, N. Y., a corporation of Virginia No Drawing. Application June 28, 1955
Serial No. 518,680

3 Claims. (Cl. 260—397.45)

This application is a continuation-in-part of my patent application, Serial No. 489,769, filed February 21, 1955, which in turn is a continuation-in-part of my parent applications, Serial No. 417,489, filed March 10, 1954, and Serial No. 343,243, filed March 18, 1953, now abandoned.

This invention relates to synthesis of valuable steroids.

In my parent application, Serial No. 489,769, I disclose a process for converting 2,4-dibromo-9α-fluoroallopregnane-11β,17α,21-triol-3,20-dione and 21-esters thereof (particularly the 21-acetate) to the following: 9α-fluoro-$\Delta^{1,4}$-pregnadiene-11β,17α,21-triol-3,20-dione; 9α-fluoro-$\Delta^{4,6}$-pregnadiene-11β,17α,21-triol-3,20-dione; and 21-esters (e. g. 21-acetates) thereof. This conversion is most readily effected by heating the dibromide with an organic base, such as a lower alkylated pyridine (e. g. collidine), the two resulting steroids then being separated from the reaction mixture by chromatography.

I have now discovered that if this conversion is done on a large scale, three additional hitherto undisclosed, physiologically active steroids are produced. These three newly discovered steroids are: 2-bromo-9α-fluoro-$\Delta^1$-pregnene-11β,17α,21-triol-3,20-dione and 21-esters thereof; 2-bromo-9α-fluorohydrocortisone and 21-esters thereof; and an isomer of 9α-fluoro-$\Delta^{1,4}$-pregnadiene-11β,17α,21-triol-3,20-dione and 21-esters thereof. Among the utilizable esterifying acids may be mentioned the carboxylic acids, especially hydrocarbon carboxylic acids containing less than ten carbon atoms as exemplified by the lower alkanoic acids (e. g. acetic, propionic, butyric and enanthic), aromatic hydrocarbon carboxylic acids (e. g. benzoic acid), and hydrocarbon aralkanoic acids (e. g. phenylacetic and β-phenylpropionic acid). The five steroid products are separated by chromatography, as more fully detailed in the following example.

If a 21-ester is initially formed, it can be hydrolized to the free 21-ol by treatment with a base, such as an alkali metal salt of carbonic acid (e. g. potassium carbonate). Furthermore, the 11β-hydroxy steroids can be oxidized with a hexavalent chromium compound (e. g. chromic acid) in an organic acid (e. g. acetic acid) to the corresponding 11-keto derivatives.

The following examples are illustrative of the invention (all temperatures being in centigrade):

EXAMPLE 1

(a) *2-bromo-9α-fluoro-$\Delta^1$-pregnene-11β,17α,21-triol-3,20-dione 21-acetate*

A solution of 20.7 g. of crude 2,4-dibromo-9α-fluoroallopregnane-11β,17α,21-triol-3,20-dione 21-acetate in 150 ml. of collidine is refluxed under nitrogen for 45 minutes. Concentration of the reaction mixture in high vacuum results in a syrupy residue, which is taken up in chloroform and extracted with dilute sulfuric acid to remove all residual collidine. The chloroform extract is then washed with dilute sodium bicarbonate and water and evaporated to dryness in vacuo. The residue (about 11.7 g.) is dissolved in 100 ml. of chloroform and 300 ml. of benzene and chromatographed on 150 g. of sulfuric acid-washed alumina. Elution of the column with 1 part chloroform and 3 parts benzene (5,000 ml.) affords 2-bromo-9α-fluoro-$\Delta^1$-pregnene-11β,17α,21-triol-3,20-dione 21acetate (about 1.1 g. crude) which after recrystallization from 95% alcohol has the following properties: M. P. about 184–185° after melting and resolidification at about 126–139°; $[\alpha]_D^{23}$ +79° (c. 0.99 in $CHCl_3$);

$\lambda_{max}^{alc}$ 250 m$\mu$ ($\epsilon$=8000); $\lambda_{max}^{Nujol}$ 2.85$\mu$, 2.98$\mu$ (OH), 5.80$\mu$ (acetylated side chain), 5.90$\mu$, 5.98$\mu$, 6.24$\mu$ (2-bromo-$\Delta^1$-3-ketone)

*Analysis.*—Calcd. for $C_{23}H_{30}O_6FBr \cdot C_2H_5OH$: C, 54.85; H, 6.63; Br, 14.59; $OC_2H_5$, 8.23. Found: C, 54.48; H, 6.78; Br, 14.50; $OC_2H_5$, 7.57.

2-bromo-9α-fluoro-$\Delta^1$-pregnene-11β,17α,21-triol-3,20-dione 21-acetate is a mineralocorticoid which can be used in the same manner as desoxycorticosterone in the treatment of Addison's disease or adrenal insufficiencies.

(b) *2-bromo-9α-fluorohydrocortisone 21-acetate (2-bromo-9α-fluoro-$\Delta^4$-pregnene-11β,17α,21-triol-3,20-dione 21-acetate)*

Further elution of the column with 1 part chloroform and 2 parts benzene (2000 ml.) furnishes 2-bromo-9α-fluoro-$\Delta^4$-pregnene-11β,17α,21-triol-3,20-dione 21-acetate (about 750 mg. crude), which after crystallization from 95% alcohol has the following properties: M. P. about 174–175°; $[\alpha]_D^{23}$+136° (c. 0.80 in $CHCl_3$);

$\lambda_{max}^{alc}$ 242 m$\mu$ ($\epsilon$=12,200); $\lambda_{max}^{CHCl_3}$ 2.85–295$\mu$ (OH), 5.78$\mu$, 5.85$\mu$ (acetylated side chain), 5.94$\mu$, 6.15$\mu$ (2-bromo-$\Delta^4$-3-ketone)

*Analysis.*—Calcd. for $C_{23}H_{30}O_6FBr$: C, 55.09; H, 6.17; Br, 15.96. Found: C, 55.70; H, 6.30; Br, 15.16.

2-bromo-9α-fluorohydrocortisone 21-acetate is about as active as hydrocortisone in the rat liver glycogen assay and hence is a glucocorticoid which can be used instead of hydrocortisone or cortisone in the treatment of rheumatoid arthritis or dermatomyositis. It is further useful as an intermediate in the preparation of 9α-fluoro-$\Delta^{1,4}$-pregnadiene-11β,17α,21-triol-3,20-dione 21-acetate and 9α-fluoro-$\Delta^{4,6}$-pregnadiene-11β,17α,21-triol-3,20-dione 21-acetate by renewed treatment with boiling collidine.

(c) *6-dehydro-9α-fluorohydrocortisone 21-acetate and 1-dehydro-9α-flurorohydrocortisone 21-acetate (9α-fluoro-$\Delta^{4,6}$-pregnadiene-11β,17α,21-triol-3,20-dione 21-acetate and 9α-fluoro-$\Delta^{1,4}$-pregnadiene-11β,17α,21-triol-3,20-dione 21-acetate)*

Continued elution with chloroform containing 5% acetone (10,000 ml.) elutes 6-dehydro-9α-fluorohydrocortisone acetate (about 2.1 g. crude), which after recrystallization from acetone-hexane has the following properties: M. P. about 216–217°; $[\alpha]_D^{23}$+123° (c. 0.36 in 95% alcohol), +135° (c. 0.36 in $CHCl_3$);

$\lambda_{max}^{alc}$ 281 m$\mu$ ($\epsilon$=23,000) [see Serial No. 489,769]

6-dehydro-9α-fluorohydrocortisone acetate is followed on the column [same eluant as above (5,000 ml.) and chloroform containing 7.5% acetone (12,000 ml.)] by 1-dehydro-9α-fluorohydrocortisone acetate (about 700 mg. crude), which after recrystallization from acetone-hexane (2 crystalline forms, needles which spontaneously change into prisms) has the following properties: M. P. about 243–245°, $[\alpha]_D^{23}$ +990 (c. 0.78 in acetone);

$\lambda_{max}^{alc}$ 238 m$\mu$ (15,000) [see serial No. 489,769]

(d) *Isomer of 1-dehydro-9α-fluorohydrocortisone 21-acetate*

Final elution of the column with 10% acetone in chloroform (7,000 ml.) followed by 15% acetone in chloroform (4,500 ml.) produces an isomer of 1-dehydro-9α-fluorohydrocortisone acetate, which after crystallization from alcohol has the following properties: M. P. about 271–272°, $[\alpha]_D^{23}$ +73° (c. 0.59 in alcohol), $\lambda_{max}^{alc}$ 237 mµ ($\epsilon$=15,200); $\lambda_{max}^{Nujol}$ 3.00µ, 5.75µ, 5.92µ, 6.04µ, 6.18µ, 6.24µ

*Analysis.*—Calcd. for $C_{23}H_{31}O_6F$ (420.46): C, 65.70; H, 6.95. Found: C, 65.96; H, 6.84.

2-bromo-9α-fluorohydrocortisone 21-acetate can be prepared from 2,4-dibromo-9α-fluoroallopregnane-11β,17α,21-triol-3,20-dione 21-acetate in higher yields and to the substantial exclusion of other steroid products by heating with collidine under milder conditions (e. g. to a temperature of about 100° C.) as illustrated by the following example:

EXAMPLE 2

A solution of 730 mg. of 2,4-dibromo-9α-fluoroallopregnane-11β,17α,21-triol-3,20-dione 21-acetate in 2 ml. of collidine is heated at 100° under nitrogen for 2 hours. The reaction mixture is dissolved in chloroform and extracted with dilute sulfuric acid, water, dilute bicarbonate and again with water. The chloroform solution is evaporated to dryness in vacuo and the residue (about 490 mg.) chromatographed on 10 g. of acid washed alumina. A mixture of benzene and chloroform (3:1, 900 ml.) elutes about 197 mg. of crude 2-bromo-9α-fluorohydrocortisone acetate, which after recrystallization from acetone hexane has M. P. about 163–164° and $[\alpha]_D^{23}$ +142° (c. 0.73 in $CHCl_3$). Its infra-red spectrum in chloroform is identical with that of the product described in Example 1, step *b*.

The invention may be otherwise variously embodied within the scope of the appended claims.

I claim:

1. A steroid selected from the group consisting of 2-bromo-9α-fluorohydrocortisone and 21-esters thereof with hydrocarbon carboxylic acids of less than ten carbon atoms.

2. A 21-ester of 2-bromo-9α-fluorohydrocortisone with a hydrocarbon carboxylic acid of less than ten carbon atoms.

3. The ester of claim 2 wherein the carboxylic acid is acetic acid.

References Cited in the file of this patent
UNITED STATES PATENTS 2,783,226    Gould et al. _____ Feb. 26, 1957

UNITED STATES PATENT OFFICE
Certificate of Correction

Patent No. 2,848,464                      August 19, 1958

Josef Fried

It is hereby certified that error appears in the printed specification of the above numbered patent requiring correction and that the said Letters Patent should read as corrected below.

Column 2, line 5, for "21acetate" read —21-acetate—; line 31, for "2.85–295$\mu$" read —2.85–2.95$\mu$—; line 67, for "+990" read —+99°—.

Signed and sealed this 11th day of November 1958.

[SEAL]

Attest:
KARL H. AXLINE,
*Attesting Officer.*

ROBERT C. WATSON,
*Commissioner of Patents.*